United States Patent
Cooke et al.

(10) Patent No.: US 8,502,990 B1
(45) Date of Patent: *Aug. 6, 2013

(54) CENTER MARKING NEST FOR METHOD OF PRECISION LOCATING

(75) Inventors: Barry T. Cooke, Black Diamond, WA (US); Douglas J. Weber, Auburn, WA (US)

(73) Assignee: The Boeing Company, Chicago, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/540,623

(22) Filed: Jul. 3, 2012

Related U.S. Application Data

(63) Continuation of application No. 12/620,598, filed on Nov. 18, 2009, now Pat. No. 8,237,934.

(51) Int. Cl.
*G01B 11/14* (2006.01)
(52) U.S. Cl.
USPC .......................................... 356/614
(58) Field of Classification Search
USPC .......................................... 356/614
See application file for complete search history.

(56) References Cited

U.S. PATENT DOCUMENTS

| | | | |
|---|---|---|---|
| 5,940,180 A * | 8/1999 | Ostby | 356/498 |
| 6,086,283 A * | 7/2000 | Ziegert | 403/57 |
| 6,097,491 A | 8/2000 | Hartrumpf | |
| 6,420,694 B1 | 7/2002 | Greenwood | |
| 7,110,194 B2 | 9/2006 | Hubbs | |
| 7,285,793 B2 | 10/2007 | Husted | |
| 8,237,934 B1 * | 8/2012 | Cooke et al. | 356/614 |
| 2004/0035277 A1 | 2/2004 | Hubbs | |

* cited by examiner

*Primary Examiner* — Tu Nguyen
(74) *Attorney, Agent, or Firm* — Ameh IP; Lowell Campbell; Elahe Toosi

(57) ABSTRACT

A system and methods for precision marking are presented. A base member is configured to slide over a surface, and a plunger is coupled to the base member and is configured to move in relation to the base member. A location marking device is coupled to the plunger, a magnetic ring is configured to hold a retro-reflector, and a magnetic ring retainer is configured to couple the magnetic ring to the plunger. A spring is coupled to the plunger and is configured to elevate the location marking device away from the surface.

20 Claims, 9 Drawing Sheets

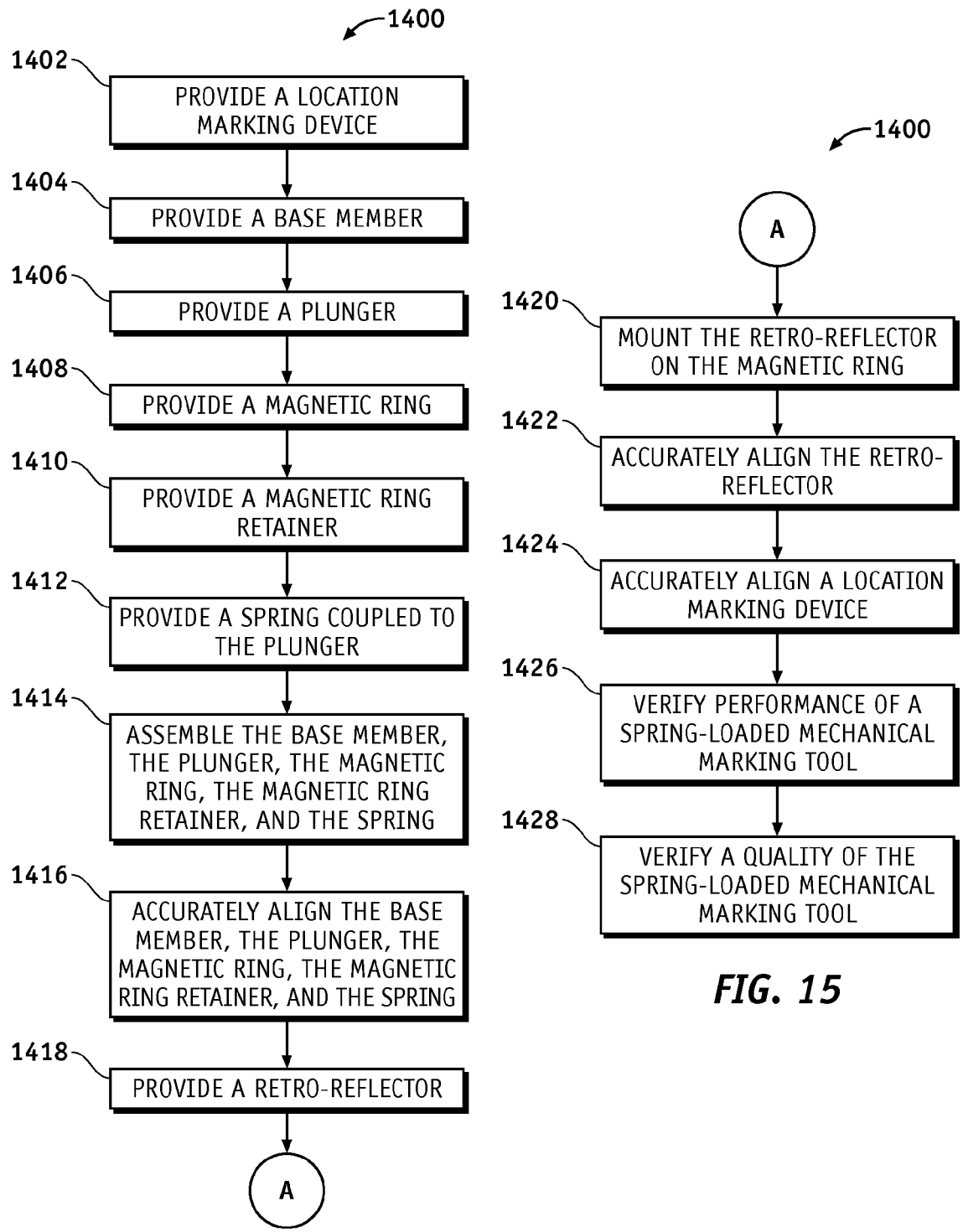

CENTER MARKING NEST FOR METHOD OF PRECISION LOCATING

CROSS-REFERENCE TO RELATED APPLICATION

This application claims priority under 35 U.S.C. 120 from and is a continuation application of U.S. patent application Ser. No. 12/620,598, filed 18 Nov. 2009 now U.S. Pat. No. 8,237,934, content of which is incorporated herein by reference in its entirety.

FIELD

Embodiments of the present disclosure relate generally to manufacturing assembly, and more particularly relate to manufacturing assembly metrology.

BACKGROUND

In manufacturing assembly, contours and locations of components, tooling, and machining should be accurately measured and positioned to match assembly specifications. Laser trackers are a particularly accurate method of measuring a position, and are often used in portable measurement systems.

A laser tracker generally operates by measuring a time for a laser beam to make a round trip from a reflector device. The reflector device is generally a retro-reflector, which is a device that reflects a light ray back in a direction of a source of the light ray. In other words, the light ray is reflected back along a vector that is parallel to but opposite in direction from the source of the light ray. A laser tracker can measure a distance and a direction to the retro-reflector. In this manner, the laser tracker can measure a location of the retro-reflector relative to the laser tracker.

For manufacturing assembly, a retro-reflector is positioned on an assembly component and a measured position/location is adjusted to match assembly specifications. When the measured position matches the assembly specifications to a sufficient accuracy, a mark such as a small dent is used to mark the location. The location can then be used in assembly by drilling, machining, fastening to another part, and the like.

Retro-reflectors are generally mounted in a spherical housing often referred to as a spherically mounted retro-reflector (SMR). The SMR may be mounted on a stable holder often referred to as an SMR nest. Existing processes for precision positioning of an existing SMR nest often require multiple technicians to perform the process. While one technician holds the existing SMR nest in a desired location, another technician inserts a duplicating punch into the existing SMR nest, and strikes the duplicating punch with a hammer marking the location with a small indentation. In addition to potentially damaging or leaving a permanent mark on the surface being worked, the existing process can also result in miss-located holes or parts. The existing process may also be very inefficient because of a need for additional labor and the associated labor cost.

Thus, there is a need for an SMR nest that can be efficiently used by a single operator, and does not cause damage or leave a permanent mark on the surface being worked.

SUMMARY

A system and methods for precision marking are disclosed. A spring-loaded mechanical marking tool (Center Marking Nest) comprising an optical retro-reflector is operable to interface with a metrology system to expedite determination of a desired feature location. The spring-loaded mechanical marking tool simplifies user operation of metrology targeting devices, and reduces or eliminates process non-conformance, potential surface damage and miss-location.

A first embodiment comprises a metrology system. The metrology system comprises a base member operable to slide over a surface, and a plunger coupled to the base member and operable to move in relation to the base member. The metrology system also comprises a location marking device coupled to the plunger. The metrology system further comprises a magnetic ring operable to hold a retro-reflector, and a magnetic ring retainer operable to couple the magnetic ring to the plunger. The metrology system also comprises a spring coupled to the plunger and operable to elevate the location marking device away from the surface.

A second embodiment comprises a non-transitory computer readable storage medium comprising computer-executable instructions for using a metrology system. The computer-executable instructions comprise measuring a distance from a tracker device to a retro-reflector based on a reflection of a light beam. The computer-executable instructions also comprise determining a position of a spring-loaded mechanical marking tool based on the distance and a direction of the retro-reflector, and recognizing the position is substantially a desired mark location. The computer-executable instructions further comprise depressing a plunger of the spring-loaded mechanical marking tool comprising a location marking device. The computer-executable instructions also comprise marking the desired mark location using the location marking device in response to depressing the plunger.

A third embodiment comprises a method of fabricating a spring-loaded mechanical marking tool. The method comprises configuring a base member to slide over a surface. The method further comprises configuring a plunger to couple to the base member and a location marking device, and to move in relation to the base member. The method further comprises configuring a magnetic ring to hold a retro-reflector, and coupling the magnetic ring to the plunger using a magnetic ring retainer. The method also comprises coupling the plunger to a spring operable to elevate the location marking device away from the surface. The method also comprises assembling the base member, the plunger, the magnetic ring, the magnetic ring retainer, and the spring, and accurately aligning the base member, the plunger, the magnetic ring, the magnetic ring retainer, and the spring.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the disclosure. The figures are provided to facilitate understanding of the disclosure without limiting the breadth, scope, scale, or applicability of the disclosure. The drawings are not necessarily made to scale.

FIGS. 14-15 is an illustration a flow diagram showing an exemplary process for fabricating a spring-loaded mechanical marking tool according to an embodiment of the disclosure.

DETAILED DESCRIPTION OF EXEMPLARY EMBODIMENTS

Figure 1:
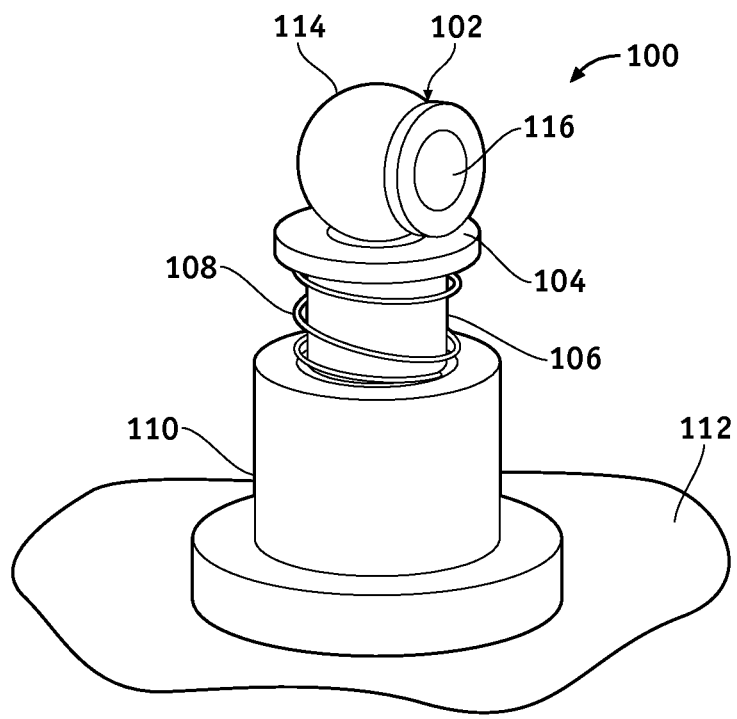
FIG. 1 is an illustration of a spring-loaded mechanical marking tool comprising an optical retro-reflector according to an embodiment of the disclosure.

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to laser technology, metrology, and other functional aspects of the systems (and the individual operating components of the systems) may not be described in detail herein. In addition, those skilled in the art will appreciate that embodiments of the present disclosure may be practiced in conjunction with manufacturing and assembly of a variety of different aircraft structures, ship structures, automotive structures, electrical systems, buildings, and the like. Those skilled in the art will also appreciate that the system described herein is merely one example embodiment of the disclosure.

Embodiments of the disclosure are described herein in the context of a practical non-limiting application, namely, a manufacturing assembly. Embodiments of the disclosure, however, are not limited to such assembly applications, and the techniques described herein may also be utilized in other applications. For example, embodiments may be applicable to home building, construction, welding, automotive manufacturing, ship building, and the like.

As would be apparent to one of ordinary skill in the art after reading this description, the following are examples and embodiments of the disclosure are not limited to operating in accordance with these examples. Other embodiments may be utilized and structural changes may be made without departing from the scope of the exemplary embodiments of the present disclosure.

A spherically mounted retro-reflector (SMR) is often mounted on a stable holder often referred to as a nest. Embodiments of the disclosure comprise a spring-loaded mechanical marking tool operable to mark a center point (center mark) on a surface. The spring-loaded mechanical marking tool (center marking nest) is operable for precision location of the center mark on the surface.

Figure 2:
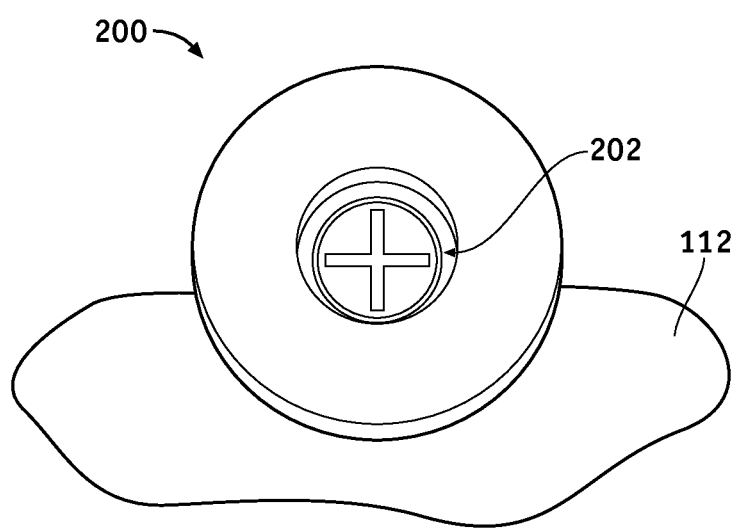
FIG. 2 is an illustration of a portion of the spring-loaded mechanical marking tool of FIG. 1 showing a location marking device according to an embodiment of the disclosure.

FIG. 1 is an illustration of a spring-loaded mechanical marking tool 100 comprising an optical retro-reflector according to an embodiment of the disclosure. The spring-loaded mechanical marking tool 100 comprises an SMR 102, a magnetic ring 104, a plunger 106, a spring 108, a base member 110, and a location marking device 202 (FIG. 2).

The SMR 102 (optical retro-reflector 102) comprises at least one optical retro-reflector housed in a spherical hollow ball 114 comprising an optical opening 116 in the spherical hollow ball 114. A laser light from a source can enter the spherical hollow ball 114 through the optical opening 116 such that the optical retro-reflector 102 can be reflected back along an incident angle to the source. The spherical hollow ball 114 may comprise, for example but without limitation, steel or another magnetic material. The optical opening 116 may be surrounded by a cover (not shown) configured to reduce or eliminate glare and protect the optical retro-reflector 102.

The magnetic ring 104 is operable to hold the optical retro-reflector 102. The magnetic ring 104 comprises a magnetic material, for example but without limitation, samarium-cobalt magnets, neodymium-iron-boron magnets, and the like.

The plunger 106 is coupled to the magnetic ring 104 by a magnetic ring retainer (not shown in FIG. 1, see FIG. 9) and coupled to the base member 110. The plunger 106 is operable to move in relation to the base member 110 by, for example but without limitation, sliding in a lubricated sleeve (e.g., the outer component 918 in FIG. 9). The plunger 106 is also operable for coupling to a location marking device such as the location marking device 202 (FIG. 2).

The spring 108 is coupled to the plunger 106 and the base member 110, and is operable to elevate the location marking device 202 (FIG. 2) away from an assembly object surface 112.

The base member 110 is coupled to the plunger 106 and shaped to hold the plunger 106 substantially perpendicular to the assembly object surface 112. The base member 110 is also operable to slide over the assembly object surface 112, and to provide a solid structural support for the plunger 106 to press the location marking device 202 (FIG. 2) on to the assembly object surface 112.

The assembly object surface 112 may comprise, for example but without limitation, metal, composite, ceramic, ceramic metal composite, plastic, glass, wood, rock, fabric, paper, and the like.

FIG. 2 is an illustration of a portion of the spring-loaded mechanical marking tool of FIG. 1 showing the location marking device 202 according to an embodiment of the disclosure. The location marking device 202 is coupled to the plunger 106 and operable to be pressed on to the assembly object surface 112 to mark a location. According to various embodiments of the disclosure, the location marking device 202 may comprise any type of marking device operable to mark a location on the assembly object surface 112. For example but without limitation, the location marking device 202 may comprise a stamp, a heated imprinting or branding device, a thermal printing device, an ink-jet, a laser scribing device, a paint gun, a chalk stick, an ink pen, and the like.

The stamp may comprise, for example but without limitation, rubber, metal, plastic, wood, and the like. The stamp may be mounted on a ridged material, such as but without limitation, steel, plastic, acrylic, and the like. An image or pattern (e.g., colored, gray scale, etc.) may be formed on the stamp by, for example but without limitation, carving, molding, laser engraving, vulcanization onto rubber, and the like. A type of ink may be applied to the image or pattern formed on the stamp to create a mark on the assembly object surface 112. The ink may be made of, for example but without limitation, dye, pigment, or the like. Alternatively, a liquid wax or paint may be used instead of ink. The stamp can be pressed by the plunger 106 onto the assembly object surface 112 such that the mark is transferred to the assembly object surface 112.

Alternatively, the mark may be provided by the assembly object surface 112. For example but without limitation, the assembly object surface 112 may be operable to change color in response to an applied pressure from the stamp to mark the assembly object surface 112. For example but without limitation, the assembly object surface 112 may be coated with a pressure reactive paint, and the like.

Alternatively, the mark may be provided by an intermediate material (not shown) located between the location marking device 202 and the assembly object surface 112. Applied pressure from the stamp to the assembly object surface 112 can transfer the mark from the intermediate material to the assembly object surface 112. The intermediate material may comprise, for example but without limitation, carbon paper, and the like.

In the embodiments where the location marking device 202 comprises the heated imprinting (branding) device or the thermal printing device, the assembly object surface 112 may be operable to change color in response to receiving thermal heat. In this manner, the assembly object surface 112 may be operable to change color to create a mark on the assembly object surface 112 in response to applied heat from the location marking device 202. For example but without limitation, the assembly object surface 112 may be coated with a thermally reactive paint, and the like. Alternatively, the mark may be provided by an intermediate material (not shown) located between the location marking device 202 and the assembly object surface 112. In this manner, the applied heat from the location marking device 202 to the assembly object surface 112 can create a mark on the assembly object surface 112 by transferring the mark from the intermediate material. The intermediate material may comprise, for example but without limitation, thermal printing paper, and the like.

Figure 3:
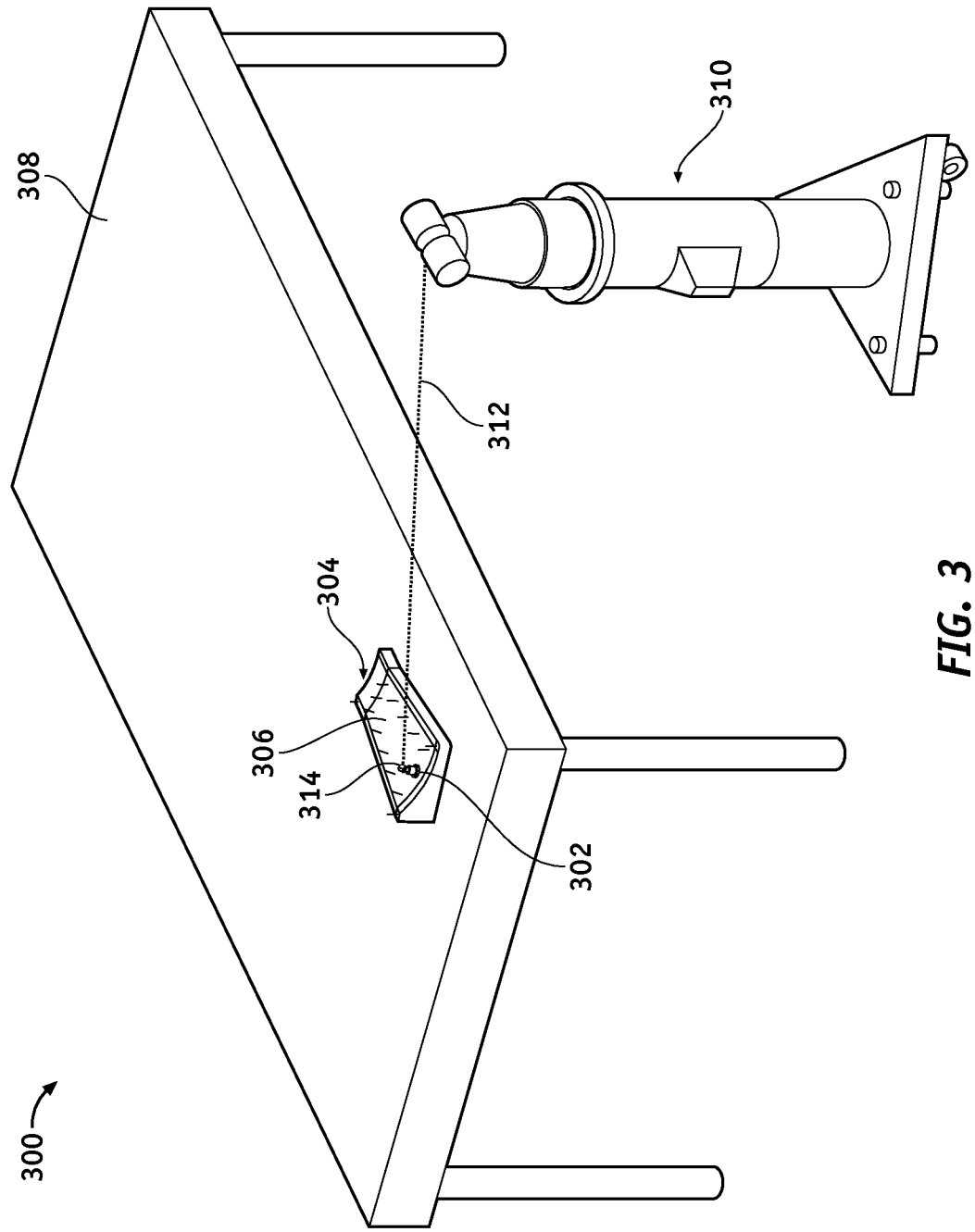
FIG. 3 is an illustration of an exemplary operation environment of a spring-loaded mechanical marking tool comprising an optical retro-reflector according to an embodiment of the disclosure.

FIG. 3 is an illustration of an exemplary operation environment 300 of a spring-loaded mechanical marking tool 302 comprising an optical retro-reflector 314 according to an embodiment of the disclosure. The spring-loaded mechanical marking tool 302 is positioned on a test object 304 comprising a contoured surface 306. The spring-loaded mechanical marking tool 302 may be manually slid over the test object 304 to mark locations for assembly activities, such as but without limitation, hole drilling, welding, machining, and the like. The test object 304 is located on a test bench 308, and a laser tracker 310 directs a laser beam 312 to the optical retro-reflector 314 of the spring-loaded mechanical marking tool 302.

Figure 4:
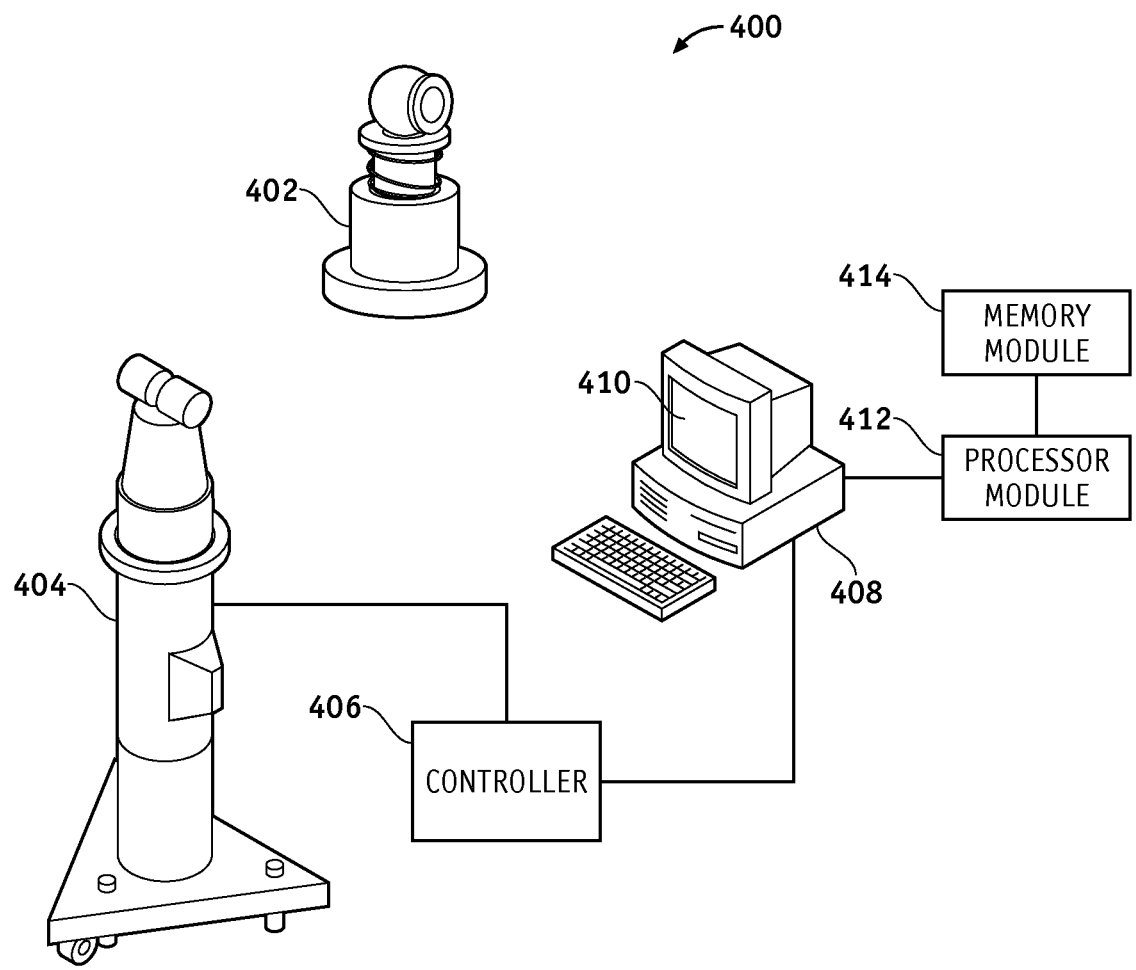
FIG. 4 is an illustration of a system comprising a spring-loaded mechanical marking tool comprising an optical retro-reflector according to an embodiment of the disclosure.

FIG. 4 is an illustration of a system 400 comprising a spring-loaded mechanical marking tool 402 comprising an optical retro-reflector (102 in FIG. 1) according to an embodiment of the disclosure. The system 400 may also comprise a laser tracker 404, a laser tracker controller 406, a computer 408, and a display 410.

The system 400 may comprise any number of communication modules, any number of network communication modules, any number of processor modules, and any number of memory modules. The illustrated system 400 depicts a simple embodiment for ease of description. Those skilled in the art will understand that the various illustrative blocks, modules, circuits, and processing logic described in connection with the embodiments disclosed herein may be implemented in hardware, computer-readable software, firmware, or any practical combination thereof. To clearly illustrate this interchangeability and compatibility of hardware, firmware, and software, various illustrative components, blocks, modules, circuits, and steps are described generally in terms of their functionality. Whether such functionality is implemented as hardware, firmware, or software depends upon the particular application and design constraints imposed on the overall system. Those familiar with the concepts described herein may implement such functionality in a suitable manner for each particular application, but such implementation decisions should not be interpreted as causing a departure from the scope of the present invention.

The laser tracker 404 is controlled by the laser tracker controller 406, and is operable to determine a position location of the spring-loaded mechanical marking tool 402. The laser tracker 404 operates by measuring a time for a round trip from the optical retro-reflector 102. The optical retro-reflector 102 reflects a laser ray back in a direction of the laser tracker 404, which is a source of the laser ray. Thus, the laser ray is reflected back along a vector that is parallel to but opposite in direction from the laser tracker 404. The laser tracker 404 measures a distance and a direction to the optical retro-reflector 102. In this manner, the laser tracker 404 can measure a location of the optical retro-reflector 102 relative to the laser tracker 404.

The computer 408 is operable to display the position location of the spring-loaded mechanical marking tool 402 on the display 410. The computer 408 may comprise a processor module 412, and a memory module 414.

The processor module 412 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration. The processor module 412 comprises processing logic that is configured to carry out the functions, techniques, and processing tasks associated with the operation of the laser tracker 404. In particular, the processing logic is configured to create a mathematical model (model) of a contoured surface to be marked by the spring-loaded mechanical marking tool 402 and determine a location of mark position relative to a position of the optical retro-reflector 102. The processor module 412 may also be suitably configured to calibrate the model to measured points on the contoured surface 306. In practical embodiments the processing logic may be resident, for example but without limitation, in the laser tracker 404, the laser tracker controller 406, the computer 408, and the like, and/or may be part of a network architecture that communicates with, for example but without limitation, the laser tracker 404, laser tracker controller 406, or the computer 408, or be a standalone portable device.

Furthermore, the steps of a method or algorithm described in connection with the embodiments disclosed herein may be embodied directly in hardware, in firmware, in a software module executed by the processor module 412, or in any practical combination thereof. A software module may reside in the memory module 414, which may be realized as RAM memory, flash memory, ROM memory, EPROM memory, EEPROM memory, registers, a hard disk, a removable disk, a CD-ROM, or any other form of storage medium known in the art. In this regard, the memory module 414 may be coupled to the processor module 412 such that the processor module 412 can read information from, and write information to, memory module 414. As an example, processor module 412, and the memory module 414, in their respective ASICs. The memory module 414 may also be integrated into the processor module 412. In an embodiment, the memory module 414 may include a cache memory for storing temporary variables or other intermediate information during execution of instructions to be executed by the processor module 412. The memory module 414 may also include non-volatile memory for storing instructions to be executed by the processor module 412.

The memory module 414 may comprise a mark location database (not shown) in accordance with an exemplary embodiment of the invention. The mark location database may be configured to store, maintain, and provide data as needed to support the functionality of system 400 in the manner described below. Moreover, mark location database may be a local database coupled to the processor 412, or may be a remote database, for example, a central network database, and the like. The mark location database may be configured to maintain, for example but without limitation, mark locations, locations to be marked, track error, and the like.

Figure 5:
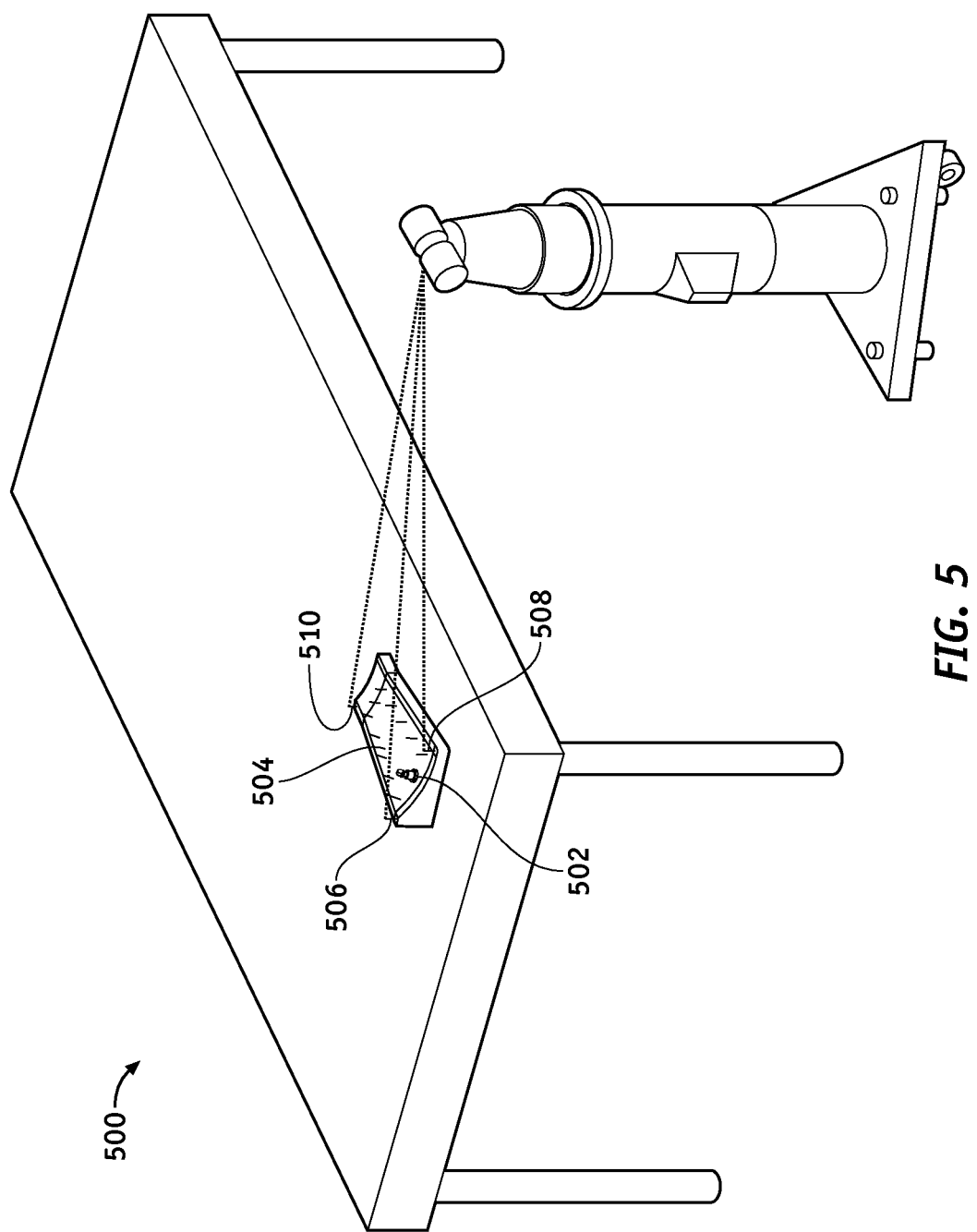
FIG. 5 is an illustration of a calibration method of a spring-loaded mechanical marking tool comprising an optical retro-reflector according to an embodiment of the disclosure.

FIG. 5 is an illustration of a calibration environment 500 of a spring-loaded mechanical marking tool 502 comprising an optical retro-reflector (314 FIG. 3) according to an embodiment of the disclosure. The calibration may be achieved by placing the spring-loaded mechanical marking tool 502 at each of three location points 506/508/510 on a contoured surface 504 and measuring a position of the retro-reflector 314 of the spring-loaded mechanical marking tool 502 at each of the three location points 506/508/510. From a position at each of the three locations 506/508/510 a positioning of the contoured surface 504 may be estimated by the computer 408. The computer 408 matches the three location points 506/508/510 to three model location points in the model in the computer 408 taking into account the distance from the optical retro-reflector 314 to the contoured surface 504. The optical retro-reflector 314 is mounted on the spring-loaded mechanical marking tool 502 at a substantially perpendicular predetermined distance from the contoured surface 504.

Figure 6:
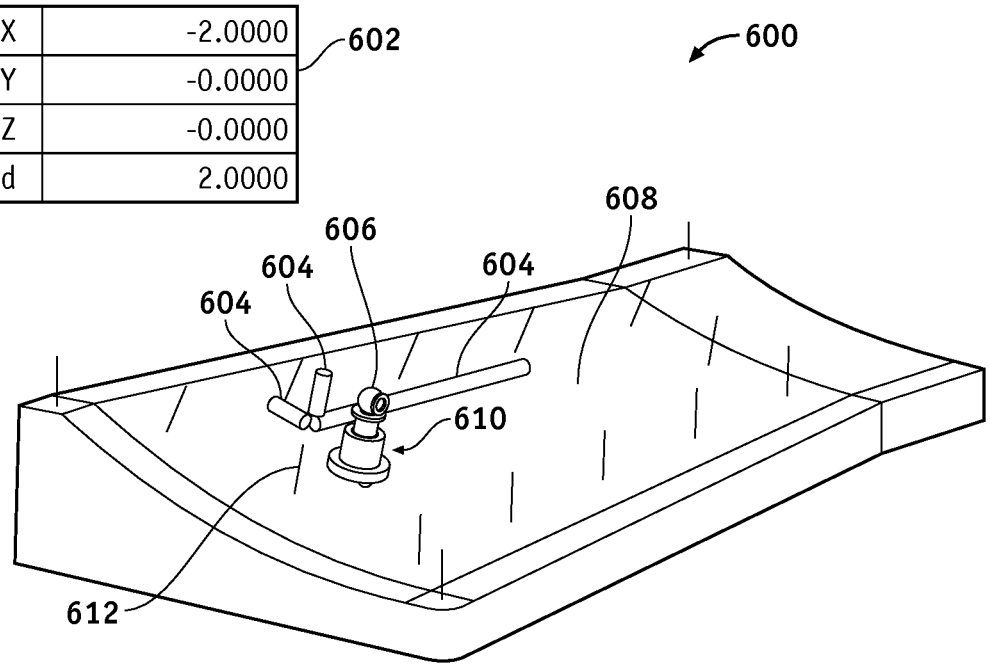
FIG. 6 is an illustration of a display readout of a control system for a spring-loaded mechanical marking tool comprising an optical retro-reflector according to an embodiment of the disclosure showing the mechanical marking tool in an out-of-position state.

FIG. 6 is an illustration of a display readout 600 of a control system for a virtual spring-loaded mechanical marking tool 610 comprising an optical retro-reflector 606 according to an embodiment of the disclosure showing the virtual spring-loaded mechanical marking tool 610 in an out-of-position state. The display readout 600 may be displayed on a display screen such as the display 410. The display readout 600 shows a list 602 of location coordinates X, Y, Z, and distance d of the spring-loaded mechanical marking tool 100 on the assembly object surface 112 relative to a desired mark location 612. The distance d may be calculated by any of a variety of distance metrics such as a Euclidian distance, a p-norm, a maximum distance, and the like. The display readout 600 also shows visual distance indicators 604 on a visual representation 608 of the assembly object surface 112. The visual distance indicators 604 represent distance from the desired mark location 612. In response to an operator moving the spring-loaded mechanical marking tool 100 on the assembly object surface 112, the virtual spring-loaded mechanical marking tool 610 moves on the display readout 600 to represent the movements, along with corresponding changes to the location coordinates X, Y, Z, and distance d listed in the list 602. In this manner, the operator can position the spring-loaded mechanical marking tool 100 at the desired mark location 612 on the assembly object surface 112 with a high degree of accuracy.

Figure 7:
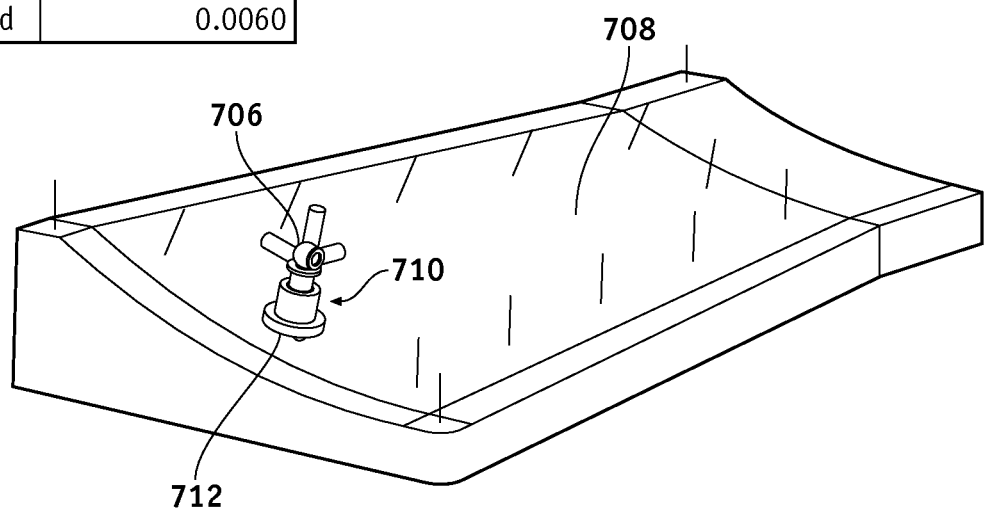
FIG. 7 is an illustration of a display readout of a control system for a spring-loaded mechanical marking tool comprising an optical retro-reflector according to an embodiment of the disclosure showing the mechanical marking tool in an in-position state.

FIG. 7 is an illustration of a display readout 700 of a control system for a virtual spring-loaded mechanical marking tool 710 comprising an optical retro-reflector 706 according to an embodiment of the disclosure showing the spring-loaded mechanical marking tool 710 in an in-position state. The display readout 700 may be displayed on a display screen such as the display 410 in response to an operator moving the spring-loaded mechanical marking tool 100 into the desired mark location 712 (612 in FIG. 6) on a visual representation of a contoured surface 708. The virtual spring-loaded mechanical marking tool 710 shows accuracy of the desired mark location 712 on the list 702. The operator may then stamp the spring-loaded mechanical marking tool 100 to mark the desired mark location 712. The desired mark location may be permanently left on the assembly object surface 112.

Figure 8:
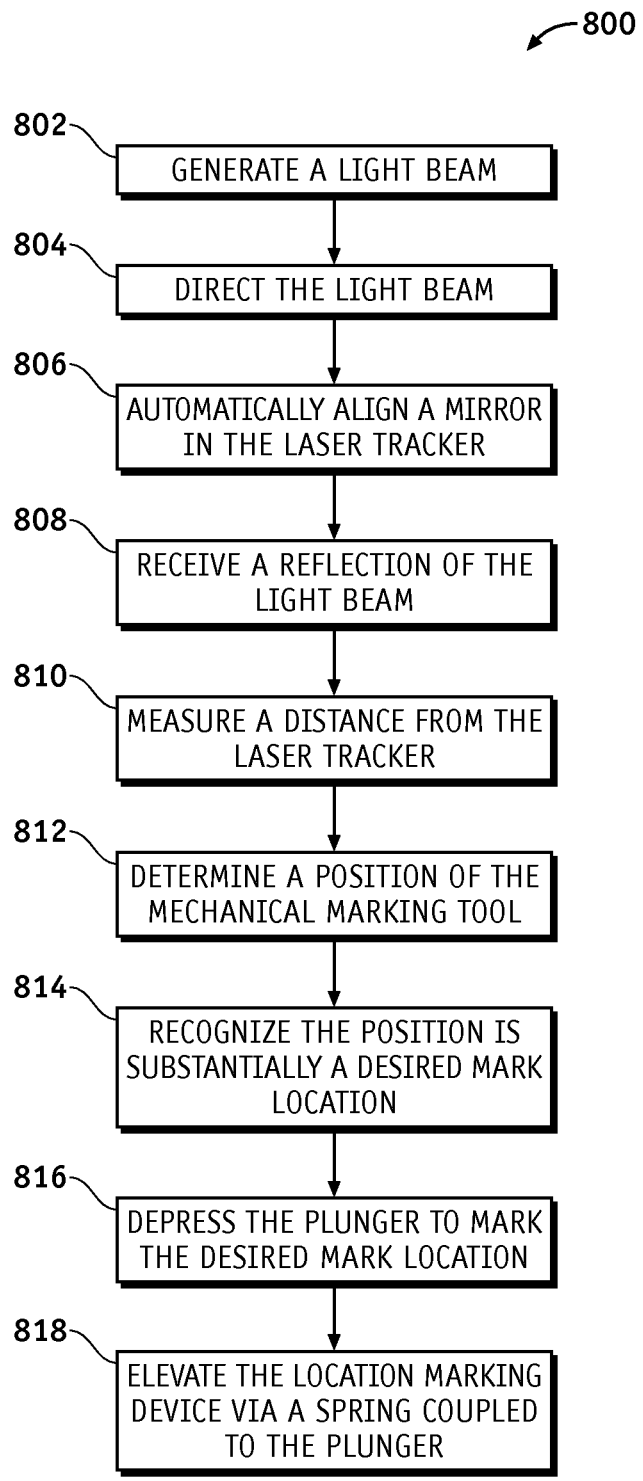
FIG. 8 is an illustration of a flow diagram showing an exemplary process for using a spring-loaded mechanical marking tool in a metrology system according to an embodiment of the disclosure.

FIG. 8 is an illustration a flow diagram showing an exemplary process 800 for using a spring-loaded mechanical marking tool in a metrology system according to an embodiment of the disclosure. The various tasks performed in connection with the process 800 may be performed by software, hardware, firmware, or any combination thereof. For illustrative purposes, the following description of the process 800 may refer to elements mentioned above in connection with FIGS. 1-7. In practical embodiments, portions of the process 800 may be performed by different elements of the spring-loaded mechanical marking tool 100 such as the SMR 102, the plunger 106, the location marking device 202, and the laser tracker 404. Process 800 may have functions, material, and structures that are similar to the embodiments shown in FIGS.

1-7. Therefore common features, functions, and elements may not be redundantly described here.

Process 800 may begin by generating a light beam operable for measuring a distance from the laser tracker 404 (task 802). Process 800 may continue by directing the light beam in a direction to the SMR 102 coupled to the spring-loaded mechanical marking tool 100 (task 804). Process 800 may continue by automatically aligning a mirror in the laser tracker 404 to ensure an emitted light pathway for the light beam and a reflected beam pathway are the same path (task 806). Process 800 may continue by receiving a reflection of the light beam at the laser tracker 404 (task 808). Process 800 may continue by measuring the distance from the laser tracker 404 to the SMR 102 based on the reflection of the light beam (task 810). Process 800 may continue by determining a position of the spring-loaded mechanical marking tool 100 based on the distance and the direction (task 812). Process 800 may continue by recognizing the position is substantially a desired mark location (task 814). Process 800 may continue by depressing the plunger 106 of the mechanical marking tool 100 to mark the desired mark location (task 816) with the location marking device 202. Process 800 may continue by elevating the location marking device 202 via the spring 108 coupled to the plunger 106 (task 818).

Figure 9:
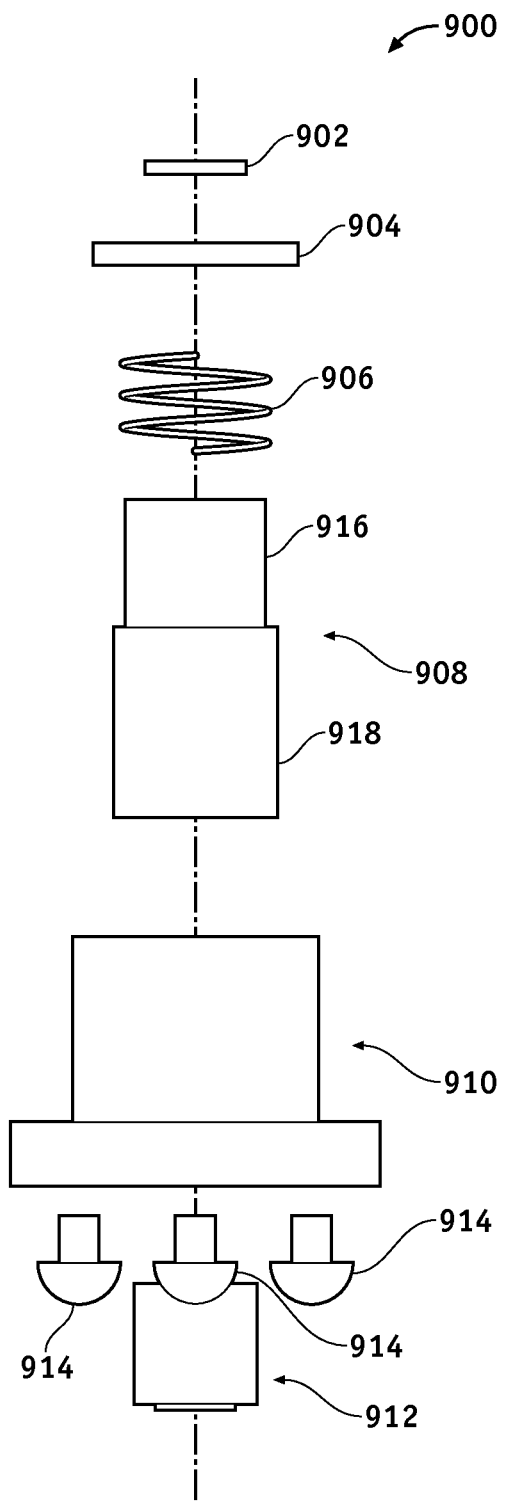
FIG. 9 is an illustration of a component breakdown of a spring-loaded mechanical marking tool according to an embodiment of the disclosure.

FIG. 9 is an illustration of a component breakdown of a spring-loaded mechanical marking tool 900 operable for mounting an optical retro-reflector according to an embodiment of the disclosure. The mechanical marking tool 900 comprises a magnetic ring 902, a magnetic ring retainer 904, a spring 906, a plunger assembly 908, a base member 910, a location marking device 912, and a plurality of surface sliders 914.

The magnetic ring 902 is operable to hold the optical retro-reflector 102 (FIG. 1). The magnetic ring 902 comprises a magnetic material, for example but without limitation, samarium-cobalt magnets, neodymium-iron-boron magnets, and the like. The magnet ring retainer 904 couples the magnetic ring 902 to the plunger assembly 908. The magnetic ring 902 and the magnet ring retainer 904 comprise a mount for the location marking device 912. The mount may be, for example but without limitation, cylindrical, disc, or the like shaped to form a recessed conical nest, which holds the optical retro-reflector 102. Alternatively, a three-point conical nest known as a kinematic mount may be used.

The plunger assembly 908 comprises an inner component 916, an outer component 918, and the spring 906 for causing relative movement between the inner component 916 and the outer component 918. The inner component 916 is coupled to the outer component 918, and operable to move (e.g., slide) relative to the outer component 918. The inner component 916 is coupled to the location marking device 912. The spring 906 is operable to elevate the location marking device 912 away from the assembly object surface 112 (FIG. 1). The inner component 916, the outer component 918, and the spring 906 of the plunger assembly 908 may comprise, for example but without limitation, metal, plastic, composites, and the like. The plunger assembly 908 is coupled to the magnetic ring 902 and the magnetic ring retainer 904.

The base member 910 may be secured to the plunger 908 by, for example but without limitation, a suitable adhesive, welded, press fit, and the like. The base member 910 is shaped to hold the plunger 908 perpendicular to the assembly object surface 112 (FIG. 1). The base member 110 is also operable to slide over the assembly object surface 112 via the surface sliders 914, while providing a solid structural support for the plunger 106, when used to press the location marking device 912 on to the assembly object surface 112. The surface sliders 914 may comprise any number of sliders, such as but without limitation, three sliders, and the like.

Figure 10:
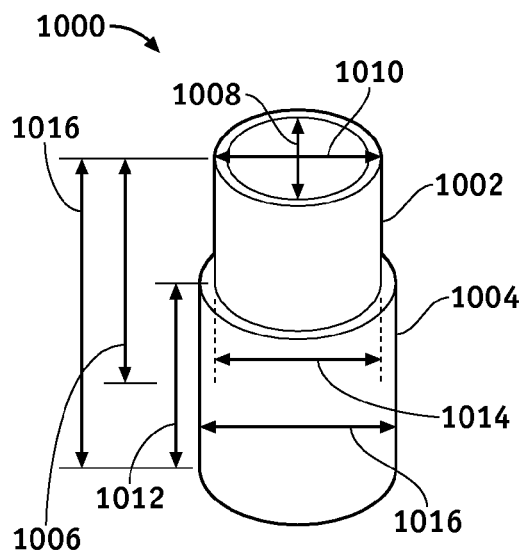
FIG. 10 is an illustration of a plunger assembly of a spring-loaded mechanical marking tool according to an embodiment of the disclosure.

FIG. 10 is an illustration of a plunger assembly 1000 of a spring-loaded mechanical marking tool according to an embodiment of the disclosure. The plunger assembly 1000 corresponds to the plunger assembly 908. In the embodiment shown in FIG. 10, the plunger assembly 1000 comprises a cylindrical shape. Alternatively, the plunger assembly 1000 may comprise, for example but without limitation, an ellipsoidal shape, a multisided shape, a square shape, a rectangular shape, and the like. The plunger assembly 1000 may be, for example but without limitation, about 8 cm in height 1016, and about 1.1 kg in weight. The plunger assembly may be made of, for example but without limitation, metal, plastic, composites, and the like. The inner component 1002 may be, for example but without limitation, about 5 cm in height 1006, about 3 cm in inner diameter 1008, about 4 cm in outer diameter 1010, and about 0.5 kg in weight. The outer component 1004 may be, for example but without limitation, about 5 cm in height 1012, about 4 cm in inner diameter 1014, about 5 cm in outer diameter 1016, and about 0.5 kg in weight. As mentioned above the plunger 1000 comprises a spring 906 (FIG. 9) to elevate the location marking device 912 away from the assembly object surface 112 (FIG. 1). The spring 906 may be, for example but without limitation, about 1 m in length, about 3 mm in diameter, and about 0.1 kg in weight.

Figure 11:
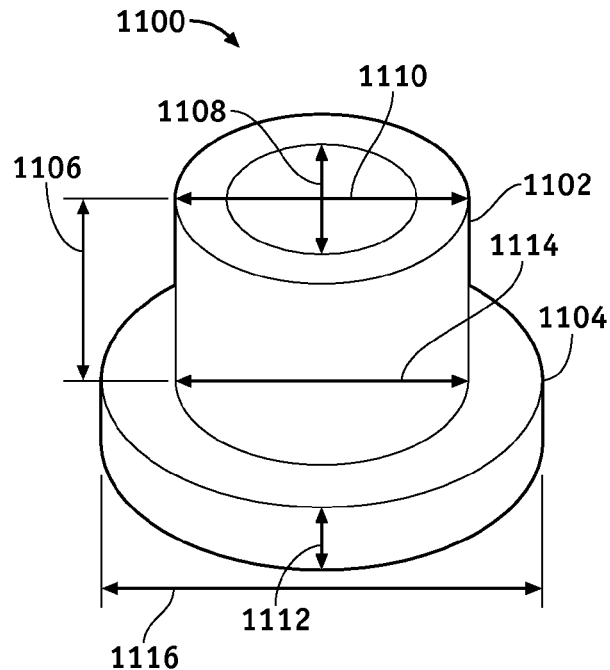
FIG. 11 is an illustration of a base member of a spring-loaded mechanical marking tool according to an embodiment of the disclosure.

FIG. 11 is an illustration of a base member 1100 of a spring-loaded mechanical marking tool according to an embodiment of the disclosure. The base member 1100 corresponds to the base member 910. In the embodiment shown in FIG. 11, the base member 1100 has a cylindrical shape with a narrow upper body 1102 and an enlarged bottom pedestal 1104. Alternatively, the base member 1100 may have, for example but without limitation, an ellipsoidal shape, a multisided shape, a square shape, a rectangular shape, and the like. The narrow upper body 1102 may be, for example but without limitation, about 3 cm in height 1106, about 5 cm in inner diameter 1108, and about 6 cm in outer diameter 1110. The enlarged bottom pedestal 1104 may be, for example but without limitation, about 1 cm in height 1112, about 6 cm in inner diameter 1114, and about 7 cm in outer diameter 1116. The base member 1100 may be, for example but without limitation, about 1.0 kg in weight, and may be made of, for example but without limitation, metal, plastic, composites, and the like.

Figure 12:
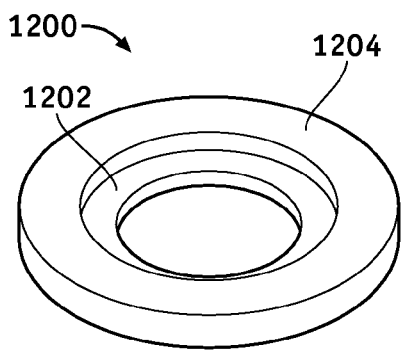
FIG. 12 is an illustration of a magnetic ring retainer of a spring-loaded mechanical marking tool according to an embodiment of the disclosure.

FIG. 12 is an illustration of a magnetic ring retainer 1200 of a spring-loaded mechanical marking tool according to an embodiment of the disclosure. The magnetic ring retainer 1200 corresponds to the magnetic ring retainer 904. In the embodiment shown in FIG. 12, the magnetic ring retainer 1200 comprises a dual annulus shape with an inner annulus 1202 and an outer annulus 1204. Alternatively, the magnetic ring retainer 1200 may have, for example but without limitation, an ellipsoidal shape, a multisided shape, a square shape, a rectangular shape, and the like. The inner annulus 1202 may be, for example but without limitation, about 0.2 cm in height, about 3 cm in inner diameter, and about 4 cm in outer diameter. The outer annulus 1204 may be, for example but without limitation, about 0.1 cm in height, about 4 cm in inner diameter, and about 5 cm in outer diameter. The magnetic ring retainer 1200 may be, for example but without limitation, about 0.2 kg in weight, and comprise metal, plastic, composites, and the like.

Figure 13:
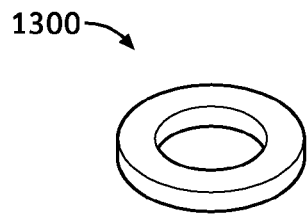
FIG. 13 is an illustration of a magnetic ring of a spring-loaded mechanical marking tool according to an embodiment of the disclosure.

FIG. 13 is an illustration of a magnetic ring 1300 of a spring-loaded mechanical marking tool according to an embodiment of the disclosure. The magnetic ring 1300 corresponds to the magnetic ring 902. The magnetic ring 1300 comprises an annulus shape. Alternately, the magnetic ring 1300 may have, for example but without limitation, an ellipsoidal shape, a multisided shape, a square shape, a rectangular shape, and the like. The magnetic ring 1300 may be for example but without limitation, about 0.2 cm in height, about 3 cm in inner diameter, about 4 cm in outer diameter, about 0.1 kg in weight, and comprise metal, plastic, composites, and the like.

FIGS. 14-15 is an illustration a flow diagram showing an exemplary process 1400 for fabricating a metrology system comprising a spring-loaded mechanical marking tool according to an embodiment of the disclosure. The various tasks performed in connection with the process 1400 may be performed by software, hardware, firmware, or any combination thereof. For illustrative purposes, the following description of the process 1400 may refer to elements mentioned above in connection with FIGS. 1-13. In practical embodiments, portions of the process 1400 may be performed by different elements of the mechanical marking tool 900 such as the magnetic ring 902, the plunger assembly 908, and the base member 910. The process 1400 may have functions, material, and structures that are similar to the embodiments shown in FIGS. 1-13. Therefore common features, functions, and elements may not be redundantly described here.

Process 1400 may begin by providing a location marking device operable to indicate (e.g., mark) a location (task 1402). Process 1400 may continue by providing a base member operable to slide over a surface (task 1404). Process 1400 may continue by providing a plunger. The plunger couples to the base member and a location marking device, and can move in relation to the base member (task 1406). Process 1400 may continue by providing a magnetic ring operable to hold a spherically mounted retro-reflector (task 1408). Process 1400 may continue by providing a magnetic ring retainer operable to couple the magnetic ring to the plunger (task 1410). Process 1400 may continue by providing a spring coupled to the plunger and operable to elevate the location marking device away from the surface (task 1412). Process 1400 may continue by assembling the base member, the plunger, the magnetic ring, the magnetic ring retainer, and the spring (task 1414). Process 1400 may continue by accurately aligning the base member, the plunger, the magnetic ring, the magnetic ring retainer, and the spring (task 1416).

Additionally, process 1400 may further continue by providing the spherically mounted retro-reflector (task 1418) to reflect a light beam, and mounting the spherically mounted retro-reflector on the magnetic ring (task 1420). Process 1400 may also accurately align the spherically mounted retro-reflector (task 1422), for example, with the location marking device, the base member, the plunger, the magnetic ring, the magnetic ring retainer, and/or the spring. Process 1400 may also accurately align the location marking device (task 1424), for example, with the base member, the plunger, the magnetic ring, the magnetic ring retainer, and/or the spring. The process 1400 may also comprise verifying performance of the spring-loaded mechanical marking tool (task 1426), and verifying a quality of the spring-loaded mechanical marking tool (task 1428). The quality of the spring-loaded mechanical marking tool may be verified by, for example but without limitation, comparison to an ideal spring-loaded mechanical marking tool, via statistical quality metrics, and the like.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-14 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A metrology system comprising:
   a base member operable to slide over a surface;
   a plunger coupled to the base member and operable to move in relation to the base member;
   a location marking device coupled to the plunger;
   a magnetic ring operable to hold a retro-reflector;
   a magnetic ring retainer operable to couple the magnetic ring to the plunger; and
   a spring coupled to the plunger and operable to elevate the location marking device away from the surface.

2. The metrology system according to claim 1, wherein the base member comprises a plurality of sliders operable to slide over the surface.

3. The metrology system according to claim 1, further comprising a laser tracker operable to determine a position of the retro-reflector.

4. The metrology system according to claim 3, further comprising a processor module operable to:
- create a mathematical model of the surface;
- calibrate the laser tracker; and
- determine a location of a desired mark location from the position of the retro-reflector.

5. The metrology system according to claim 4, further comprising a display module operable to display position information of the retro-reflector.

6. The metrology system according to claim 1, wherein the location marking device comprises a stamping device operable to mark a desired mark location on the surface.

7. The metrology system according to claim 6, wherein the desired mark location is permanently left on the surface.

8. A non-transitory computer readable storage medium comprising computer-executable instructions for using a metrology system, the computer-executable instructions comprising:
- measuring a distance from a tracker device to a retro-reflector based on a reflection of a light beam;
- determining a position of a spring-loaded mechanical marking tool based on the distance and a direction of the retro-reflector;
- recognizing the position is substantially a desired mark location; and
- depressing a plunger of the spring-loaded mechanical marking tool comprising a location marking device; and
- marking the desired mark location using the location marking device in response to depressing the plunger.

9. The non-transitory computer readable storage medium of claim 8, the computer-executable instructions further comprising:
- generating the light beam operable to measure the distance from the tracker device;
- directing the light beam in a direction to the retro-reflector coupled to the spring-loaded mechanical marking tool;
- automatically aligning a mirror in the tracker device to ensure an emitted light pathway for the light beam and a reflected beam pathway are a same path; and
- receiving the reflection of the light beam at the tracker device.

10. The non-transitory computer readable storage medium of claim 8, the computer-executable instructions further comprising displaying position information of the spring-loaded mechanical marking tool on a display.

11. The non-transitory computer readable storage medium of claim 8, the computer-executable instructions further comprising calibrating the metrology system.

12. The non-transitory computer readable storage medium of claim 8, wherein the desired mark location is permanently marked on a surface.

13. A method of fabricating a spring-loaded mechanical marking tool, the method comprising:
- configuring a base member to slide over a surface;
- configuring a plunger to:
  - couple to the base member and a location marking device; and
  - move in relation to the base member;
- configuring a magnetic ring to hold a retro-reflector;
- coupling the magnetic ring to the plunger using a magnetic ring retainer;
- coupling the plunger to a spring operable to elevate the location marking device away from the surface;
- assembling the base member, the plunger, the magnetic ring, the magnetic ring retainer, and the spring; and
- aligning accurately the base member, the plunger, the magnetic ring, the magnetic ring retainer, and the spring.

14. The method of claim 13, further comprising:
- configuring the location marking device to indicate a location; and
- mounting the location marking device on the plunger.

15. The method of claim 14, further comprising accurately aligning the location marking device with at least one member selected from the group consisting of: the base member, the plunger, the magnetic ring, the magnetic ring retainer, and the spring.

16. The method of claim 14, wherein the location marking device is operable to permanently mark the location on the surface.

17. The method of claim 13, further comprising mounting the retro-reflector on the magnetic ring, wherein the retro-reflector is operable to retro-reflect a light beam.

18. The method of claim 17, further comprising accurately aligning the retro-reflector with at least one member selected from the group consisting of: the base member, the plunger, the magnetic ring, the magnetic ring retainer, and the spring.

19. The method of claim 13, further comprising verifying performance of the spring-loaded mechanical marking tool.

20. The method of claim 13, further comprising verifying a quality of the spring-loaded mechanical marking tool.

* * * * *